US012669687B2

(12) United States Patent
Hagiwara

(10) Patent No.: US 12,669,687 B2
(45) Date of Patent: Jun. 30, 2026

(54) ZOOM LENS AND IMAGING APPARATUS INCLUDING THE SAME

(71) Applicant: CANON KABUSHIKI KAISHA, Tokyo (JP)

(72) Inventor: Yasuaki Hagiwara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 18/614,461

(22) Filed: Mar. 22, 2024

(65) Prior Publication Data

US 2024/0329367 A1 Oct. 3, 2024

(30) Foreign Application Priority Data

Mar. 28, 2023 (JP) ................................. 2023-051695

(51) Int. Cl.
*G02B 15/14* (2006.01)
*G02B 13/00* (2006.01)
*G02B 13/02* (2006.01)

(52) U.S. Cl.
CPC ......... *G02B 13/02* (2013.01); *G02B 13/0045* (2013.01); *G02B 13/009* (2013.01); *G02B 15/144105* (2019.08)

(58) Field of Classification Search
CPC .... G02B 15/145101; G02B 15/145105; G02B 15/145109; G02B 15/145113; G02B 15/145117; G02B 15/145121; G02B 15/145125; G02B 15/145129
See application file for complete search history.

(56) References Cited

FOREIGN PATENT DOCUMENTS

| | | | | |
|---|---|---|---|---|
| JP | WO2015146067 | * 3/2015 | .......... | G02B 13/009 |
| JP | 2017198887 A | 11/2017 | | |
| JP | 2018205434 A | 12/2018 | | |
| JP | 2020067542 A | 4/2020 | | |
| WO | 2015146067 A1 | 10/2015 | | |

* cited by examiner

*Primary Examiner* — Joseph P Martinez
(74) *Attorney, Agent, or Firm* — Canon U.S.A., Inc. IP Division

(57) ABSTRACT

A zoom lens includes a first lens unit with positive refractive power, a second lens unit with negative refractive power, an intermediate group including an aperture stop and at least one lens unit, and a rear group including at least two lens units placed in this order from an object side to an image side, and an interval between adjacent lens units changes during zooming. The lens unit of the rear group placed closest to the object side has the strongest negative refractive power among lens units placed closer to the image side than the aperture stop. In zooming from a wide-angle end to a telephoto end, every lens unit of the first lens unit, the intermediate group, and the rear group moves toward the object side, and the second lens unit moves along a convex trajectory toward the image side. The zoom lens satisfies predetermined inequalities.

22 Claims, 11 Drawing Sheets

ZOOM LENS AND IMAGING APPARATUS INCLUDING THE SAME

BACKGROUND

Technical Field

The aspect of the embodiments relates to a zoom lens suitable for use in imaging apparatuses, such as digital video cameras, digital still cameras, broadcasting cameras, and silver-halide film cameras.

Description of the Related Art

In recent years, there have been demands for an imaging optical system for use in imaging apparatuses that has high optical performance and a high magnification ratio and is compact in size.

WO2015/146067 discusses an optical system including six lens units to realize an imaging optical system that has a high magnification ratio and is compact in size.

A zoom lens discussed in WO2015/146067 includes positive, negative, positive, positive, negative, and positive lens units placed in this order from an object side to an image side. Since the second lens unit has strong refractive power, magnification chromatic aberration at a wide-angle end often increases, and variation in field curvature that occurs during zooming often becomes significant.

SUMMARY

According to an aspect of the embodiments, a zoom lens includes a plurality of lens units, the plurality of lens units consisting of a first lens unit with positive refractive power, a second lens unit with negative refractive power, an intermediate group including an aperture stop and at least one lens unit, and a rear group including at least two lens units placed in this order from an object side to an image side, wherein an interval between adjacent lens units changes during zooming. The lens unit of the rear group that is placed closest to the object side has the strongest negative refractive power among lens units placed closer to the image side than the aperture stop. In zooming from a wide-angle end to a telephoto end, every lens unit included in the first lens unit, the intermediate group, and the rear group moves toward the object side, and the second lens unit moves along a convex trajectory toward the image side. The optical system satisfies the following inequalities:

$$3.30 < f1/|f2| < 5.90,$$

$$1.40 < |f2|/bfw < 2.50, \text{ and}$$

$$1.00 < fn/f2 < 1.60,$$

where f1 is a focal length of the first lens unit, f2 is a focal length of the second lens unit, bfw is a back focus of an entire system at a wide-angle end, and fn is a combined focal length of the rear group at the wide-angle end.

Further features of the disclosure will become apparent from the following description of exemplary embodiments with reference to the attached drawings.

DESCRIPTION OF THE EMBODIMENTS

Figure 1:
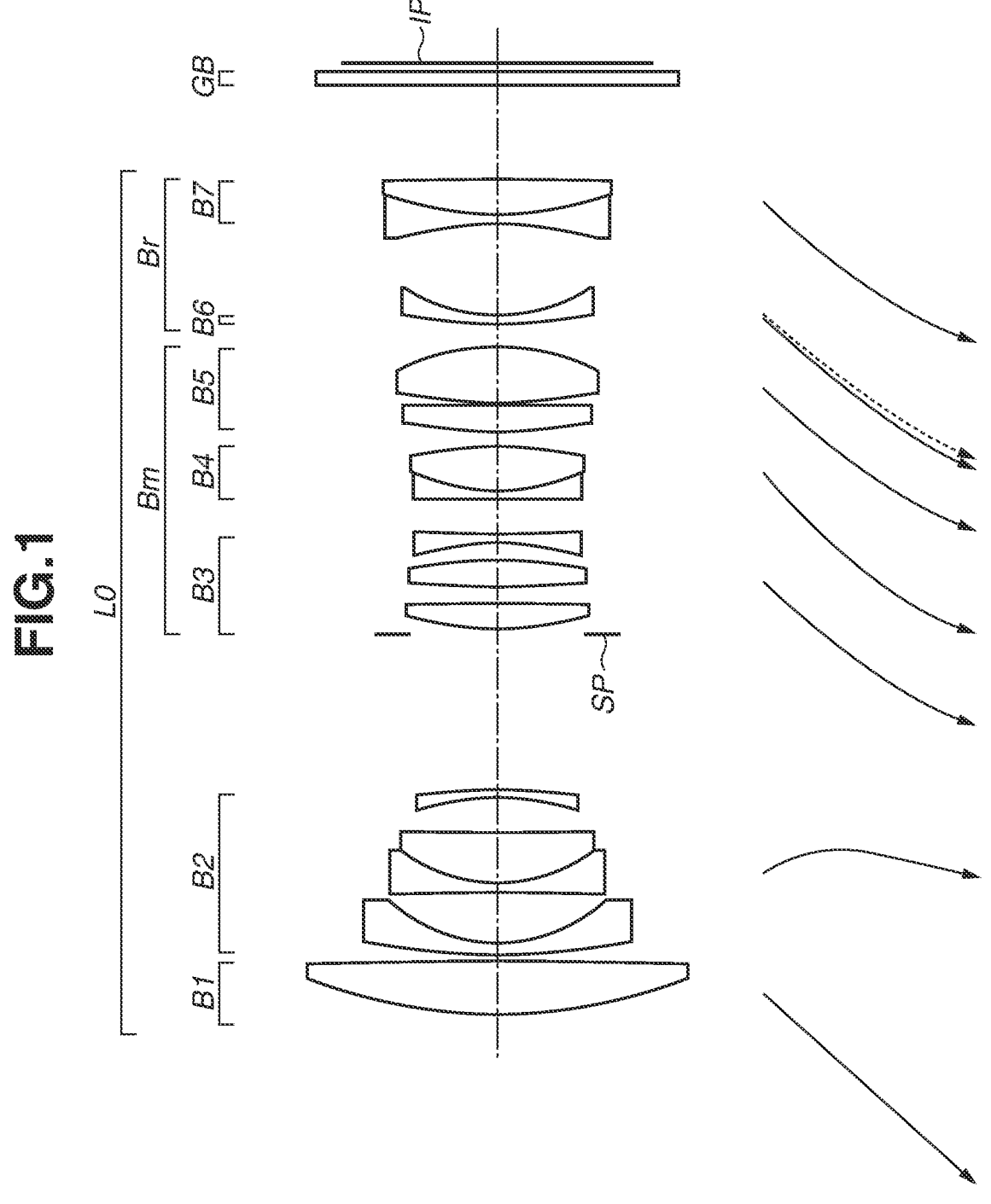
FIG. 1 illustrates a lens cross-sectional view of a zoom lens according to a first exemplary embodiment at a wide-angle end.

Optical systems and imaging apparatuses including the same according to various exemplary embodiments of the disclosure will be described below with reference to the attached drawings.

FIGS. 1, 3, 5, 7, and 9 illustrate cross-sectional views of zoom lenses L0 according to first to fifth exemplary embodiments. The zoom lenses L0 according to the exemplary embodiments are zoom lenses for use in imaging apparatuses, such as digital video cameras, digital still cameras, broadcasting cameras, silver-halide film cameras, monitoring cameras, and in-vehicle cameras.

In each lens cross-sectional view, the left-hand side is an object side, and the right-hand side is an image side. The zoom lenses L0 according to the exemplary embodiments may be used as a projection lens in a projector. In such a case, the left-hand side is a screen side, and the right-hand side is a projection image side.

Solid-line arrows illustrated in the lower parts of the lens cross-sectional views indicate movement trajectories of lens units in zooming from a wide-angle end to a telephoto end in a case where an object at infinity is focused. Dashed-line arrows illustrated in the lower parts of the lens cross-sectional views indicate movement trajectories of the lens units in zooming from the wide-angle end to the telephoto end in a case where an object at a close distance is focused.

In each lens cross-sectional view, there is an aperture stop SP. In zooming from the wide-angle end to the telephoto end, the aperture stop SP may be moved without changing intervals between the aperture stop and the lens units on an optical axis or may be moved while changing the intervals between the aperture stop SP and the lens units on the optical axis. In a case where the zoom lens according to any one of the exemplary embodiments is used in a digital still camera or a digital video camera, an imaging plane of a solid-state image sensor (photoelectric conversion element), such as a charge-coupled device (CCD) sensor or a complementary metal oxide semiconductor (CMOS) sensor, is placed on an image plane IP. In a case where the zoom lens according to any one of the exemplary embodiments is used as an imaging optical system of a silver-halide film camera, a photosensitive surface corresponding to a film surface is placed on the image plane IP.

The zoom lenses L0 according to the exemplary embodiments each consist of a first lens unit B1 with positive refractive power, a second lens unit B2 with negative refractive power, an intermediate group Bm including an aperture stop SP and at least one lens unit, and a rear group Br including at least one lens unit placed in this order from the object side to the image side. Further, an interval between adjacent lens units changes during zooming. The lens unit of the rear group Br that is placed closest to the object side has the strongest negative refractive power among the lens units placed closer to the image side than the aperture stop SP. Each lens unit may consist of a single lens or a plurality of lenses.

Figure 2:
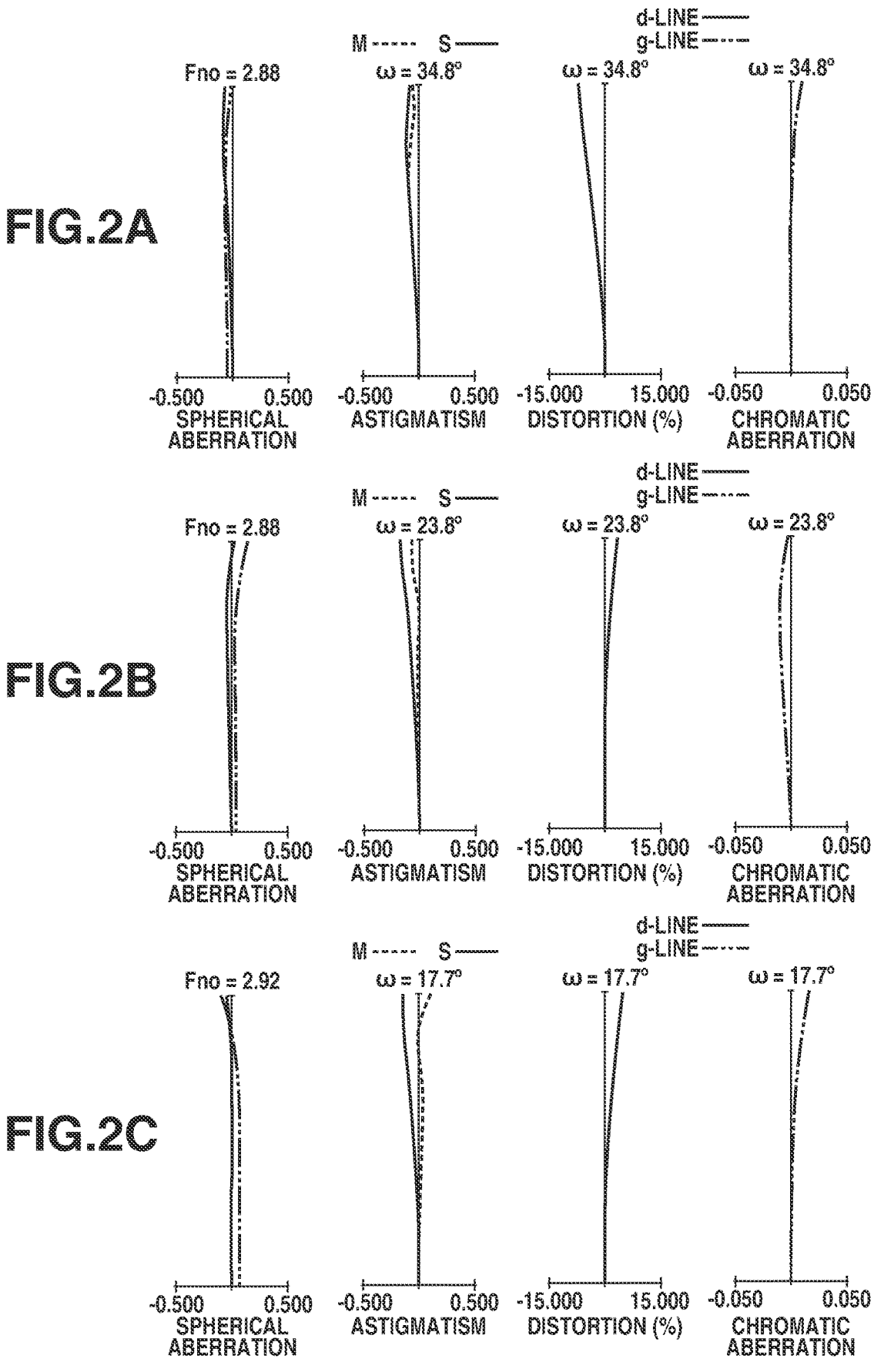
FIG. 2A illustrates an aberration diagram of the zoom lens according to the first exemplary embodiment at the wide-angle end.
FIG. 2B illustrates an aberration diagram of the zoom lens according to the first exemplary embodiment at a zoom intermediate position.
FIG. 2C illustrates an aberration diagram of the zoom lens according to the first exemplary embodiment at a telephoto end.
Figures 4A, 4B, 4C:
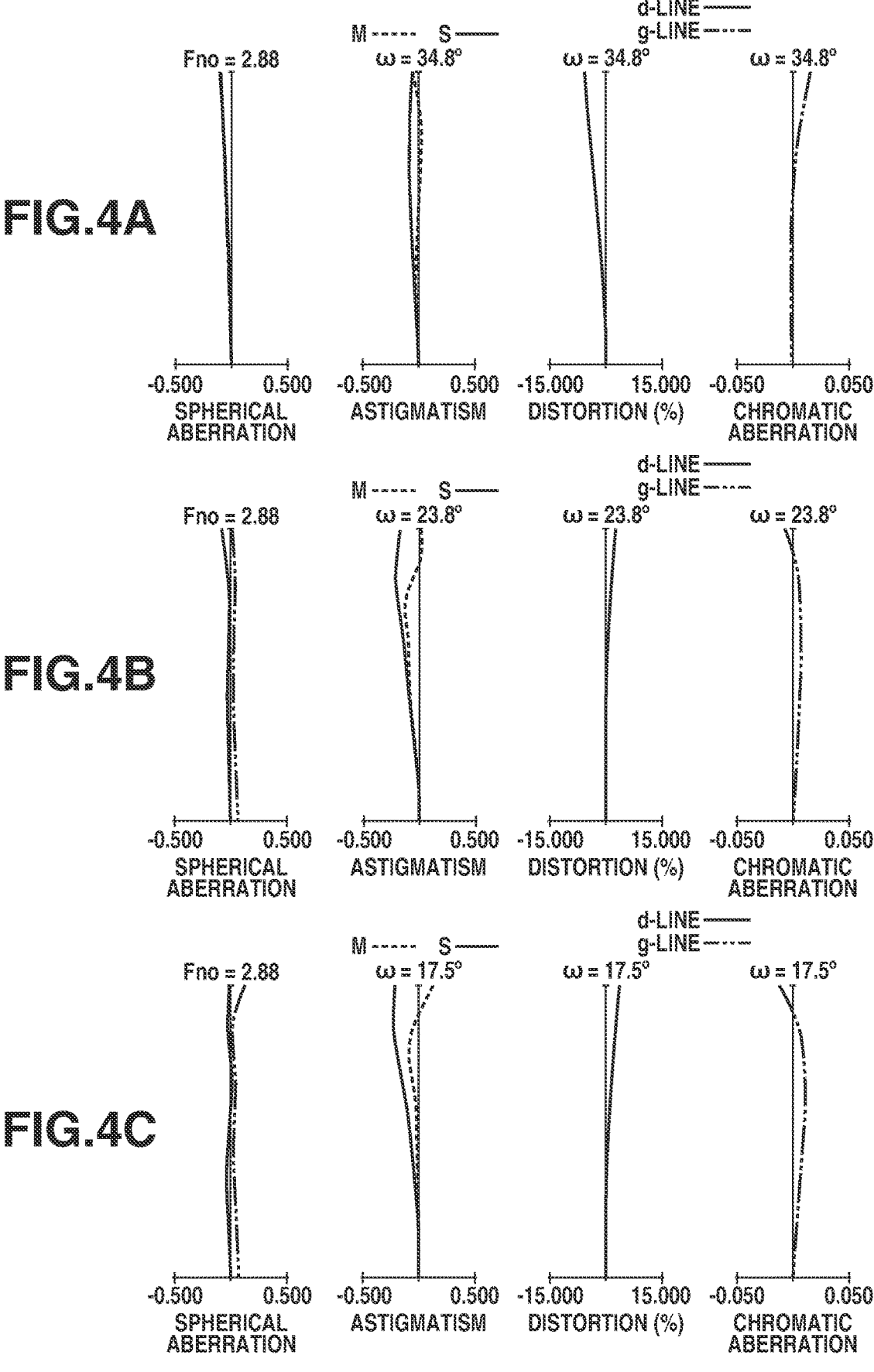
FIG. 4A illustrates an aberration diagram of the zoom lens according to the second exemplary embodiment at the wide-angle end.
FIG. 4B illustrates an aberration diagram of the zoom lens according to the second exemplary embodiment at the zoom intermediate position.
FIG. 4C illustrates an aberration diagram of the zoom lens according to the second exemplary embodiment at the telephoto end.
Figure 6:
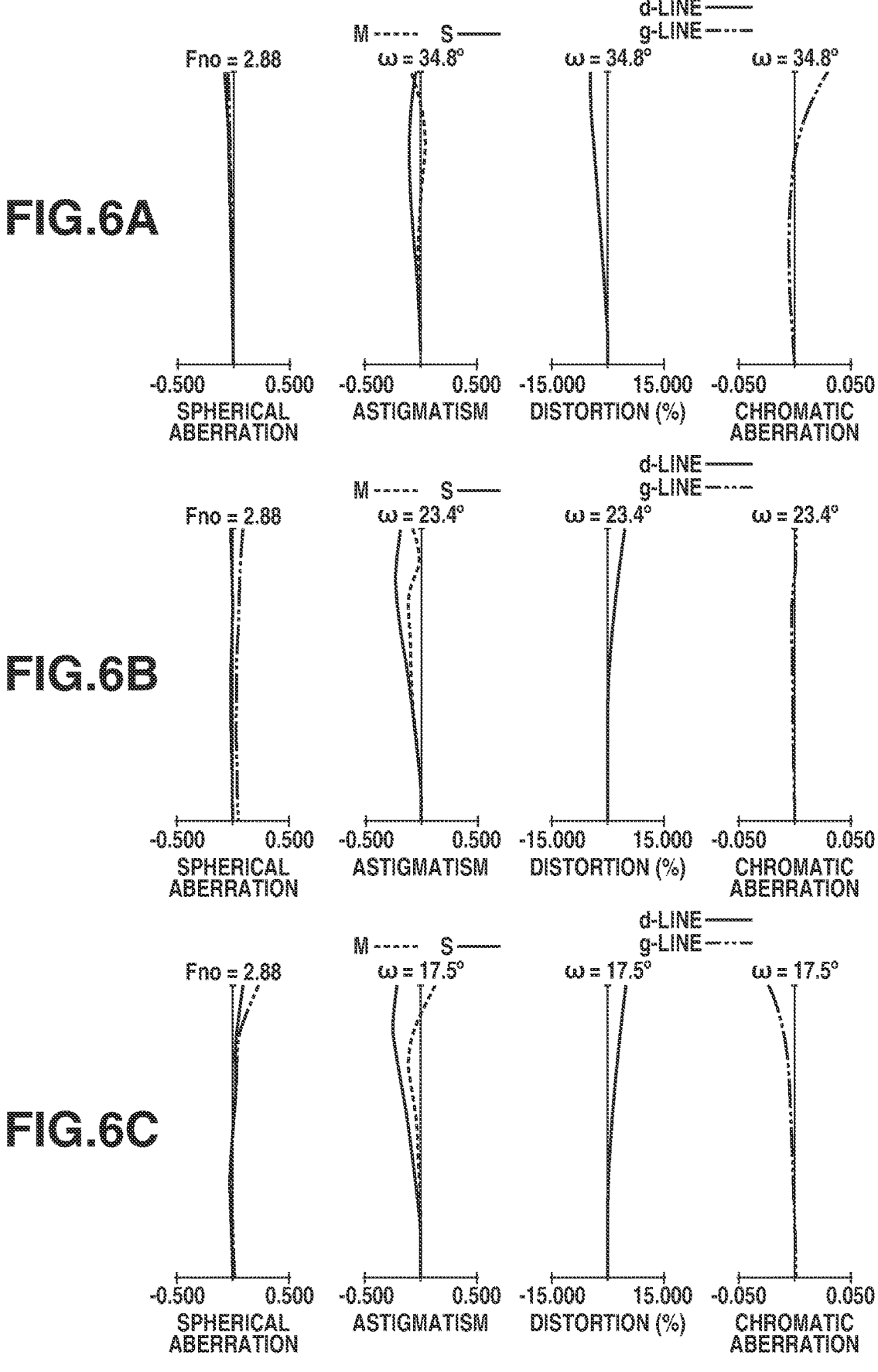
FIG. 6A illustrates an aberration diagram of the zoom lens according to the third exemplary embodiment at the wide-angle end.
FIG. 6B illustrates an aberration diagram of the zoom lens according to the third exemplary embodiment at the zoom intermediate position.
FIG. 6C illustrates an aberration diagram of the zoom lens according to the third exemplary embodiment at the telephoto end.
Figures 8A, 8B, 8C:
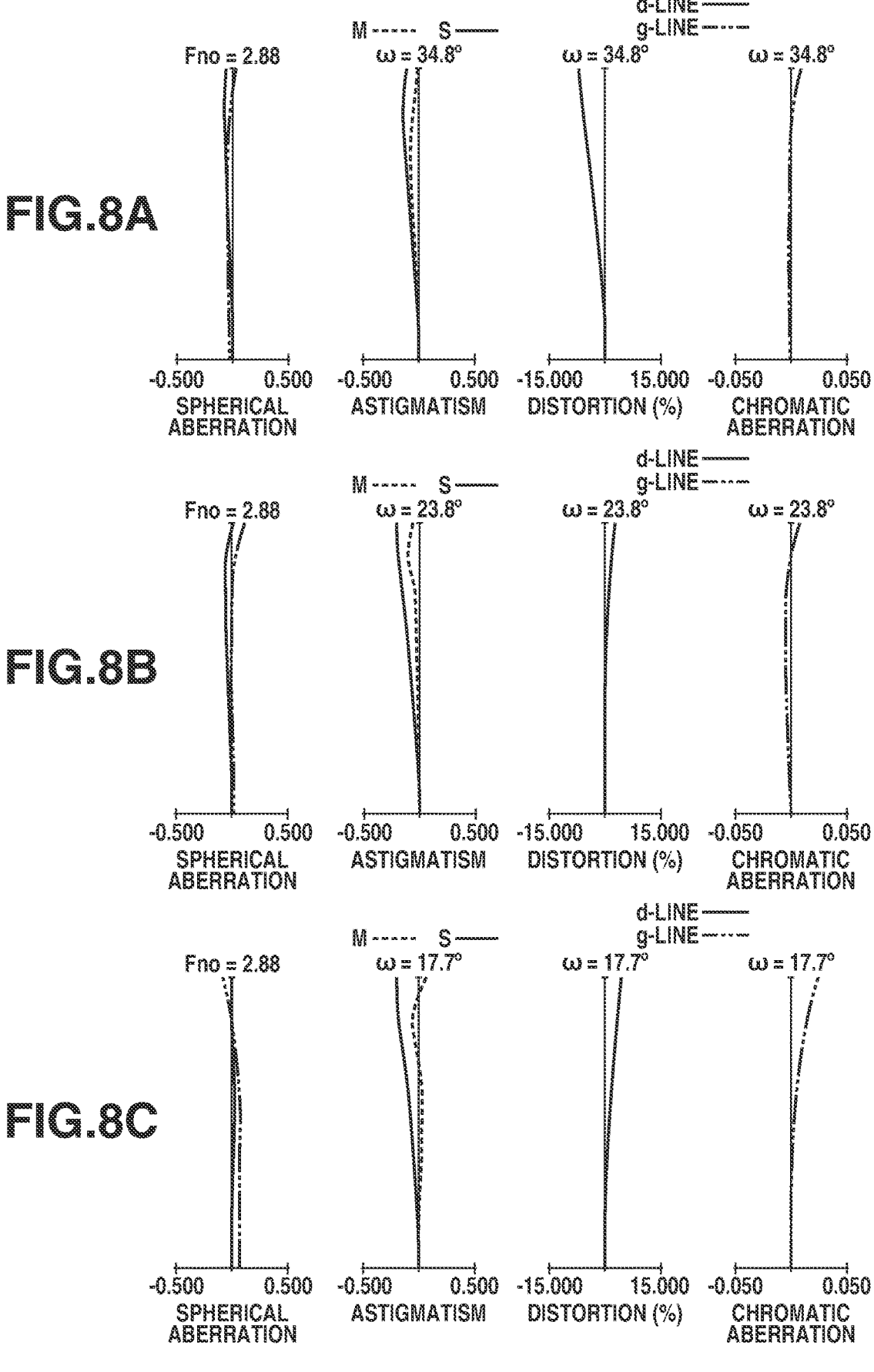
FIG. 8A illustrates an aberration diagram of the zoom lens according to the fourth exemplary embodiment at the wide-angle end.
FIG. 8B illustrates an aberration diagram of the zoom lens according to the fourth exemplary embodiment at the zoom intermediate position.
FIG. 8C illustrates an aberration diagram of the zoom lens according to the fourth exemplary embodiment at the telephoto end.
Figures 10A, 10B, 10C:
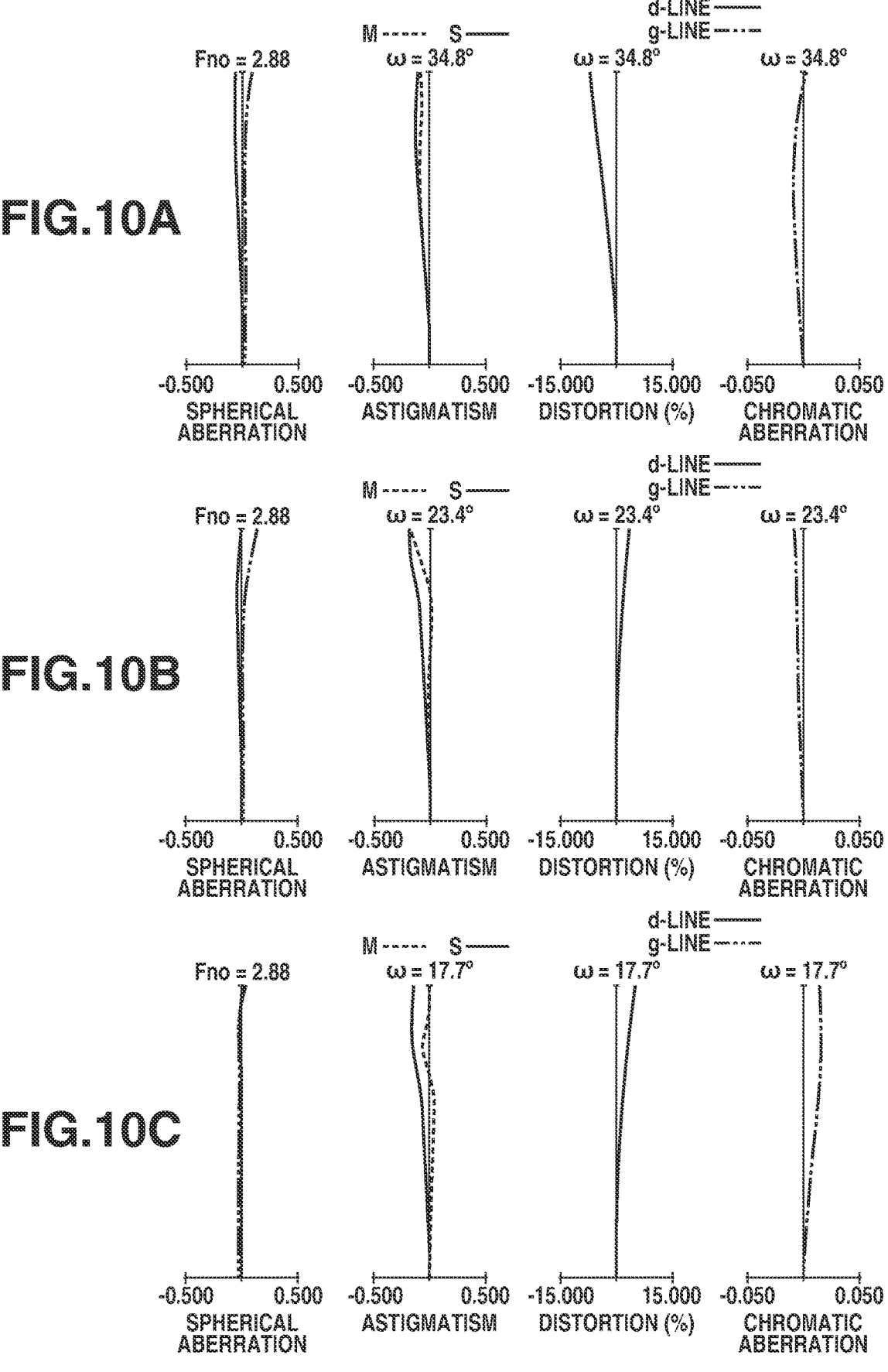
FIG. 10A illustrates an aberration diagram of the zoom lens according to the fifth exemplary embodiment at the wide-angle end.
FIG. 10B illustrates an aberration diagram of the zoom lens according to the fifth exemplary embodiment at the zoom intermediate position.
FIG. 10C illustrates an aberration diagram of the zoom lens according to the fifth exemplary embodiment at the telephoto end.

FIGS. 2A to 2C illustrate aberration diagrams of the zoom lens according to the first exemplary embodiment at the wide-angle end, a zoom intermediate position, and the telephoto end in focusing on an object at infinity. FIGS. 4A to 4C illustrate aberration diagrams of the zoom lens according to the second exemplary embodiment at the wide-angle end, a zoom intermediate position, and the telephoto end in focusing on an object at infinity. FIGS. 6A to 6C illustrate aberration diagrams of the zoom lens according to the third exemplary embodiment at the wide-angle end, a zoom intermediate position, and the telephoto end in focusing on an object at infinity. FIGS. 8A to 8C illustrate aberration diagrams of the zoom lens according to the fourth exemplary embodiment at the wide-angle end, a zoom intermediate position, and the telephoto end in focusing on an object at infinity. FIGS. 10A to 10C illustrate aberration diagrams of the zoom lens according to the fifth exemplary embodiment at the wide-angle end, a zoom intermediate position, and the telephoto end in focusing on an object at infinity.

In each spherical aberration diagram, an F-number (Fno) is indicated, and spherical aberration amounts with respect to the d-line (wavelength 587.6 nm) and the g-line (wavelength 435.8 nm) are presented. In each astigmatism diagram, an aberration amount S indicates an aberration amount on a sagittal image plane, and an aberration amount M indicates an aberration amount on a meridional image plane. In each distortion aberration diagram, a distortion aberration amount with respect to the d-line is presented. In each chromatic aberration diagram, a magnification chromatic aberration amount in the g-line is presented. The mark "ω" indicates an imaging half angle of view (°).

Next, distinctive configurations of the zoom lenses according to the exemplary embodiments will now be described.

The zoom lenses L0 according to the exemplary embodiments each include the first lens unit B1 with positive refractive power and the second lens unit B2 with negative refractive power to place principal points of the entire system on the object side and to shorten a total lens length (length from a lens surface of the zoom lens L0 that is placed closest to the object side to the image plane on the optical axis). Furthermore, the zoom lenses L0 according to the exemplary embodiments each include the intermediate group Bm including the aperture stop SP and at least one lens unit and the rear group Br including at least two lens units. The lens unit of the rear group Br that is placed closest to the object side has the strongest negative refractive power among the lens units placed closer to the image side than the aperture stop SP. In a case where the aperture stop SP is placed between a lens of one lens unit that is placed closest to the object side and a lens of the one lens unit that is placed closest to the image side, the lens unit of the rear group Br that is placed closest to the object side is the lens unit with the strongest negative refractive power among the lens units placed closer to the image side than the one lens unit. By placing the lens units closer to the image side than the aperture stop SP, variation in various aberrations that may occur during zooming is prevented.

Further, in zooming from the wide-angle end to the telephoto end, the first lens unit B1 moves toward the object side to thereby shorten the total lens length at the wide-angle end. Furthermore, a third lens unit B3 and every lens unit of the intermediate group Bm and the rear group Br move toward the object side to thereby prevent air intervals between adjacent lens units from changing significantly. This makes it possible to prevent an increase in height of on-axis marginal rays incident on the lens units at the telephoto end from the optical axis and an increase in height of off-axis rays from the optical axis, making it possible to reduce diameters of lenses placed in the lens units.

Further, in zooming from the wide-angle end to the telephoto end, the second lens unit B2 moves along a convex trajectory toward the image side to thereby reduce a field curvature amount at the zoom intermediate position. Here, the description "moving along the convex trajectory toward the image side" means "moving toward the image side in zooming from the wide-angle end to the zoom intermediate position and moving toward the object side in zooming from the zoom intermediate position to the telephoto end".

Further, the zoom lenses L0 according to the exemplary embodiments are configured to satisfy the following inequalities:

$$3.30 < f1/|f2| < 5.90 \tag{1},$$

$$1.40 < |f2|/bfw < 2.50 \tag{2, and}$$

$$1.00 < fn/f2 < 1.60 \tag{3}.$$

In the inequalities, f1 is a focal length of the first lens unit B1, f2 is a focal length of the second lens unit B2, bfw is a back focus of the entire system at the wide-angle end, and fn is a combined focal length of the rear group Br at the wide-angle end.

Inequalities (1), (2), and (3) are for correcting various aberrations and realizing a high magnification ratio and compactness in size.

In a case where the refractive power of the second lens unit B2 is strong such that inequality (1) exceeds the upper limit, it becomes difficult to correct magnification chromatic aberration especially at the wide-angle end and variation in field curvature especially at the wide-angle end that occurs during zooming. In a case where the refractive power of the second lens unit B2 is weak such that inequality (1) falls below the lower limit, a movement amount of the second lens unit B2 in zooming increases to achieve a high magnification ratio. Consequently, the total lens increases which is undesirable.

In a case where the back focus of the entire system at the wide-angle end is small such that inequality (2) exceeds the upper limit, the refractive power of the first lens unit B1 is strong, and it becomes difficult to correct magnification chromatic aberration especially at the wide-angle end. In a case where the back focus of the entire system at the wide-angle end is large such that inequality (2) falls below the lower limit, the total lens length increases which is undesirable.

In a case where the absolute value of the combined focal length of the rear group Br at the wide-angle end is large such that inequality (3) exceeds the upper limit, the principal point of the entire system is placed on the image side. Consequently, the total lens length increases which is undesirable. In a case where the absolute value of the combined focal length of the rear group Br at the wide-angle end is small such that inequality (3) falls below the lower limit, it becomes difficult to correct field curvature and magnification chromatic aberration especially at the wide-angle end.

The foregoing configuration makes it possible to realize a zoom lens that has high optical performance and a high magnification ratio and is compact in size.

In one embodiment, at least one of the upper and lower limits of any numerical range of inequalities (1), (2), (3) is set to a numerical value indicated by the following inequalities (1a), (2a), and (3a):

$$3.70 < f1/|f2| < 5.60 \tag{1a},$$

$$1.60 < |f2|/bfw < 2.40 \tag{2a}, \text{ and}$$

$$1.10 < fn/f2 < 1.58 \tag{3a}.$$

In another embodiment, at least one of the upper and lower limits of any numerical range of inequalities (1), (2), and (3) is set to a numerical value indicated by the following inequalities (1b), (2b), and (3b):

$$4.00 < f1/|f2| < 5.40 \tag{1b},$$

$$1.70 < |f2|/bfw < 2.10 \tag{2b}, \text{ and}$$

$$1.28 < fn/f2 < 1.56 \tag{3b}.$$

Next, configurations of the zoom lenses L0 according to the exemplary embodiments will be described.

In one embodiment, the first lens unit B1 consists of one lens. The one-lens configuration makes it possible to reduce the thickness of the first lens unit B1 in an optical axis direction to shorten the total lens length.

In one embodiment, the second lens unit B2 consists of four lenses. The four-lens configuration makes it possible to prevent variation in field curvature that occurs especially during zooming.

The lens unit of the rear group Br, which is placed closest to the object side, moves in focusing. Off-axis rays that travel through lenses in the rear group Br are relatively low in height from the optical axis, so that the lens units that move in focusing may be reduced in a radial direction.

Next, inequalities will be described in which the zoom lenses L0 according to the exemplary embodiments satisfy.

The zoom lenses L0 according to the exemplary embodiments satisfy one or more of the following inequalities:

$$1.31 < f1/ft < 2.81 \tag{4},$$

$$0.66 < |f2|/fw < 1.41 \tag{5},$$

$$1.14 < Lt/ft < 2.49 \tag{6},$$

$$0.43 < fp/|fn| < 1.04 \tag{7},$$

$$0.19 < |fn/f1| < 0.46 \tag{8},$$

$$1.00 < ff/f2 < 2.74 \tag{9},$$

$$0.67 < ff/fn < 2.04 \tag{10},$$

$$0.28 < fp/ft < 0.56 \tag{11},$$

$$0.88 < |fn|/fw < 2.03 \tag{12},$$

$$0.38 < |fn|/ft < 0.85 \tag{13},$$

$$2.83 < Lt/fp < 5.92 \tag{14}, \text{ and}$$

$$1.74 < Lt/|fn| < 4.37 \tag{15}.$$

In the inequalities, ft is a focal length of the entire system at the telephoto end, fw is a focal length of the entire system at the wide-angle end, Lt is a length from the lens surface closest to the object side to the lens surface closest to the image side on the optical axis at the telephoto end, fp is a combined focal length of the intermediate group Bm at the wide-angle end, and ff is a focal length of the lens unit of the rear group Br that is placed closest to the object side.

Next, technical meanings of inequalities (4) to (15) will be described.

In a case where the refractive power of the first lens unit B1 is weak such that inequality (4) exceeds the upper limit, a movement amount of the first lens unit B1 in zooming increases, and the total lens length at the telephoto end increases. In a case where the refractive power of the first lens unit B1 is strong such that inequality (4) falls below the lower limit, it becomes difficult to correct spherical aberration especially at the telephoto end.

In a case where the refractive power of the second lens unit B2 is weak such that inequality (5) exceeds the upper limit, the movement amount of the second lens unit B2 in zooming increases, and the total lens length increases. In a case where the refractive power of the second lens unit B2 is strong such that inequality (5) falls below the lower limit, it becomes difficult to correct variation in field curvature that occurs during zooming.

In a case where inequality (6) exceeds the upper limit, the total lens length at the telephoto end increases. In a case where the total lens length at the telephoto end is short such that inequality (6) falls below the lower limit, the refractive power of the first lens unit B1 becomes strong, and it becomes difficult to correct spherical aberration especially at the telephoto end.

In a case where the absolute value of the combined focal length of the rear group Br at the wide-angle end is small such that inequality (7) exceeds the upper limit, it becomes difficult to correct field curvature and magnification chromatic aberration especially at the wide-angle end. In a case where the combined focal length of the intermediate group Bm at the wide-angle end is small such that inequality (7) falls below the lower limit, it becomes difficult to correct spherical aberration and coma aberration especially at the wide-angle end.

In a case where the refractive power of the first lens unit B1 is strong such that inequality (8) exceeds the upper limit, it becomes difficult to correct spherical aberration especially at the telephoto end. In a case where the absolute value of the combined focal length of the rear group Br at the wide-angle end is small such that inequality (8) falls below the lower limit, it becomes difficult to correct field curvature and magnification chromatic aberration especially at the wide-angle end.

In a case where the refractive power of the lens unit of the rear group Br that is placed closest to the object side is weak such that inequality (9) exceeds the upper limit, a movement amount of the lens unit of the rear group Br that is placed closest to the object side in zooming increases, and the total lens length at the telephoto end increases. In a case where the refractive power of the lens unit of the rear group Br that is placed closest to the object side is strong such that inequality (9) falls below the lower limit, it becomes difficult to correct coma aberration and field curvature especially at the wide-angle end.

In a case where the absolute value of the combined focal length of the rear group Br at the wide-angle end is small such that inequality (10) exceeds the upper limit, it becomes difficult to correct field curvature and magnification chromatic aberration especially at the wide-angle end. In a case where the absolute value of the combined focal length of the rear group Br at the wide-angle end is large such that inequality (10) falls below the lower limit, the principal point of the entire system is placed on the image side. Consequently, the total lens length increases.

In a case where the combined focal length of the intermediate group Bm at the wide-angle end is large such that inequality (11) exceeds the upper limit, a movement amount of the intermediate group Bm in zooming increases, and the total lens length increases. In a case where the combined focal length of the intermediate group Bm at the wide-angle end is small such that inequality (11) falls below the lower limit, it becomes difficult to correct spherical aberration and coma aberration especially at the wide-angle end.

In a case where the focal length of the entire system at the wide-angle end is small such that inequality (12) exceeds the upper limit, especially the height of off-axis rays incident on the first lens unit B1 from the optical axis increases. Consequently, the diameter of the lens placed in the first lens unit B1 increases which is undesirable. In a case where the absolute value of the combined focal length of the rear group Br at the wide-angle end is small such that inequality (12) falls below the lower limit, it becomes difficult to correct field curvature and magnification chromatic aberration especially at the wide-angle end.

In a case where the absolute value of the combined focal length of the rear group Br at the wide-angle end is large such that inequality (13) exceeds the upper limit, movement amounts of the lens units placed in the rear group Br in zooming increase, and the total lens length increases. In a case where the focal length of the entire system at the telephoto end is large such that inequality (13) falls below the lower limit, the refractive power of the first lens unit B1 becomes strong. Consequently, it becomes difficult to correct spherical aberration especially at the telephoto end.

In a case where the combined focal length of the intermediate group Bm at the wide-angle end is small such that inequality (14) exceeds the upper limit, it becomes difficult to correct spherical aberration and coma aberration especially at the wide-angle end. In a case where the total lens length at the telephoto end is short such that inequality (14) falls below the lower limit, the refractive power of the first lens unit B1 becomes strong. Consequently, it becomes difficult to correct spherical aberration especially at the telephoto end.

In a case where the absolute value of the combined focal length of the rear group Br at the wide-angle end is small such that inequality (15) exceeds the upper limit, it becomes difficult to correct field curvature and magnification chromatic aberration especially at the wide-angle end. In a case where the total lens length is short such that inequality (15) falls below the lower limit, the refractive power of the first lens unit B1 becomes strong. Consequently, it becomes difficult to correct spherical aberration especially at the telephoto end.

In one embodiment, at least one of the upper and lower limits of inequalities (4) to (15) is set to a numerical range specified below:

$$1.49 < f1/ft < 2.59 \tag{4a}$$

$$0.75 < |f2|/fw < 1.30 \tag{5a}$$

$$1.30 < Lt/ft < 2.30 \tag{6a}$$

$$0.49 < fp/|fn| < 0.96 \tag{7a}$$

$$0.21 < |fn|/f1 < 0.42 \tag{8a}$$

$$1.15 < ff/f2 < 2.53 \tag{9a}$$

$$0.77 < ff/fn < 1.89 \tag{10a}$$

$$0.32 < fp/ft < 0.51 \tag{11a}$$

$$1.01 < |fn|/fw < 1.88 \tag{12a}$$

$$0.43 < |fn|/ft < 0.79 \tag{13a}$$

$$3.24 < Lt/fp < 5.46 \tag{14a, and}$$

$$1.99 < Lt/|fn| < 4.04 \tag{15a}$$

Further, in yet another embodiment, at least one of the upper and lower limits of inequalities (4) to (15) is set to a numerical range specified below:

$$1.77 < f1/ft < 2.27 \tag{4b}$$

$$0.89 < |f2|/fw < 1.14 \tag{5b}$$

$$1.55 < Lt/ft < 2.01 \tag{6b}$$

$$0.58 < fp/|fn| < 0.84 \tag{7b}$$

$$0.26 < |fn|/f1 < 0.37 \tag{8b}$$

$$1.36 < ff/f2 < 2.22 \tag{9b}$$

$$0.91 < ff/fn < 1.65 \tag{10b}$$

$$0.38 < fp/ft < 0.45 \tag{11b}$$

$$1.20 < |fn|/fw < 1.64 \tag{12b}$$

$$0.51 < |fn|/ft < 0.69 \tag{13b}$$

$$3.85 < Lt/fp < 4.78 \tag{14b, and}$$

$$2.36 < Lt/|fn| < 3.53 \tag{15b}$$

Next, details of configurations of the zoom lenses L0 according to the exemplary embodiments will be described.

As illustrated in FIG. 1, the zoom lens L0 according to the first exemplary embodiment consists of the first lens unit B1 with positive refractive power, the second lens unit B2 with negative refractive power, the intermediate group Bm, and the rear group Br placed in this order from the object side to the image side.

The intermediate group Bm consists of the third lens unit B3 with positive refractive power, a fourth lens unit B4 with negative refractive power, and a fifth lens unit B5 with positive refractive power placed in this order from the object side to the image side. The rear group Br consists of a sixth lens unit B6 with negative refractive power and a seventh lens unit B7 with negative refractive power placed in this order from the object side to the image side. By properly placing the lens units with positive refractive power and the lens units with negative refractive power, various aberrations are suitably corrected across the entire zoom range.

The second lens unit B2 consists of four lenses that are a negative lens, a negative lens, a positive lens, and a negative lens placed in this order from the object side to the image side. By configuring the second lens unit B2 consisting of four lenses and placing the positive lens, variation in magnification chromatic aberration that occurs in the second lens unit B2 in zooming is prevented.

In order to reduce the thickness in the optical axis direction and the size in the radial direction of each lens unit that moves in focusing, the sixth lens unit B6 consisting of one negative lens also moves toward the image side in focusing from an object at infinity to an object at close distance. The one negative lens of the sixth lens unit B6 has a meniscus shape with a convex surface facing the object side. With the meniscus shape with the convex surface facing the object side, variation in spherical aberration that occurs in focusing is prevented.

The aperture stop that determines Fno is placed closer to the object side than the third lens unit B3. Placing the aperture stop on the object side of the third lens unit B3 having a relatively small diameter makes it possible to reduce the diameter of the aperture stop.

Figure 3:
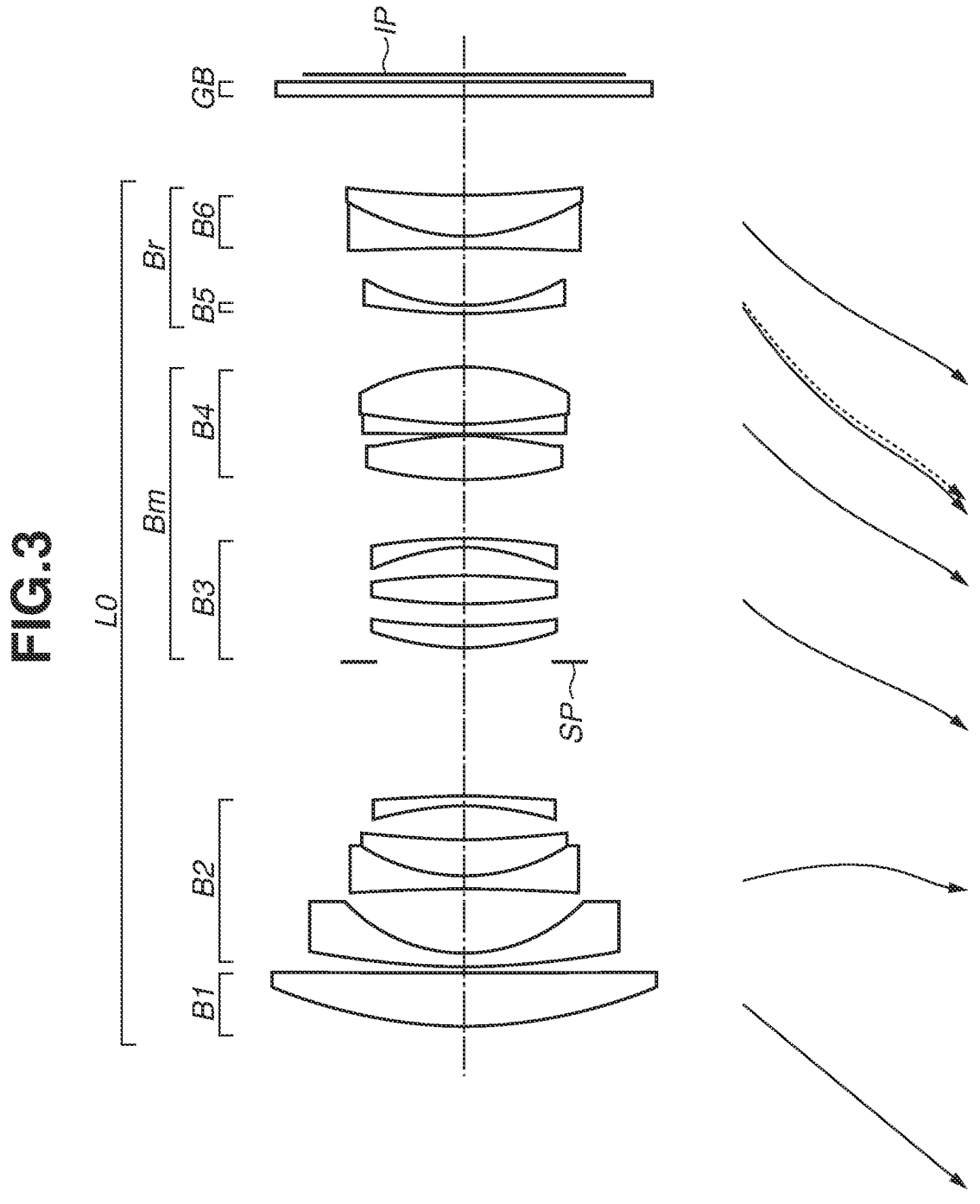
FIG. 3 illustrates a lens cross-sectional view of a zoom lens according to a second exemplary embodiment at the wide-angle end.

As illustrated in FIG. 3, the zoom lens L0 according to the second exemplary embodiment consists of the first lens unit B1 with positive refractive power, the second lens unit B2 with negative refractive power, the intermediate group Bm, and the rear group Br placed in this order from the object side to the image side.

The intermediate group Bm consists of the third lens unit B3 with positive refractive power and the fourth lens unit B4 with positive refractive power placed in this order from the object side to the image side. The rear group Br consists of the fifth lens unit B5 with negative refractive power and the sixth lens unit B6 with negative refractive power placed in this order from the object side to the image side.

In the zoom lens L0 according to the second exemplary embodiment, the number of lens units in the rear group Br is reduced compared to the first exemplary embodiment to prevent relative decentering between lens units that occurs during zooming, making it easier to achieve high optical performance.

Figure 5:
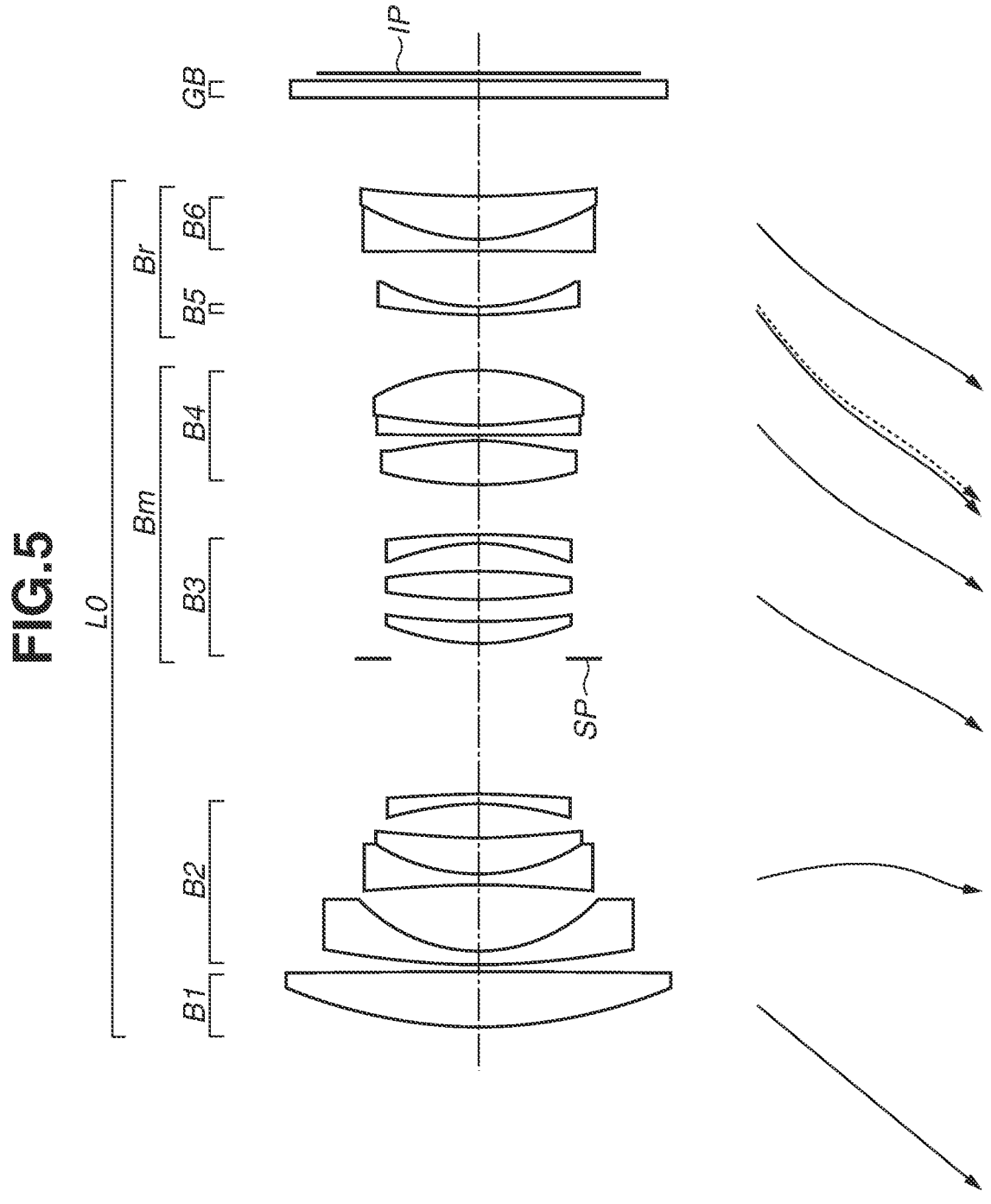
FIG. 5 illustrates a lens cross-sectional view of a zoom lens according to a third exemplary embodiment at the wide-angle end.

As illustrated in FIG. 5, the zoom lens L0 according to the third exemplary embodiment consists of the first lens unit B1 with positive refractive power, the second lens unit B2 with negative refractive power, the intermediate group Bm, and the rear group Br placed in this order from the object side to the image side.

The intermediate group Bm consists of the third lens unit B3 with positive refractive power and the fourth lens unit B4 with positive refractive power placed in this order from the object side to the image side. The rear group Br consists of the fifth lens unit B5 with negative refractive power and the sixth lens unit B6 with positive refractive power placed in this order from the object side to the image side.

In the zoom lens L0 according to the third exemplary embodiment, the sixth lens unit B6 placed next to the object side of the fifth lens unit B5 with negative refractive power has positive refractive power, unlike the second exemplary embodiment, making it easier to correct magnification chromatic aberration that occurs in the fifth lens unit B5.

Figure 7:
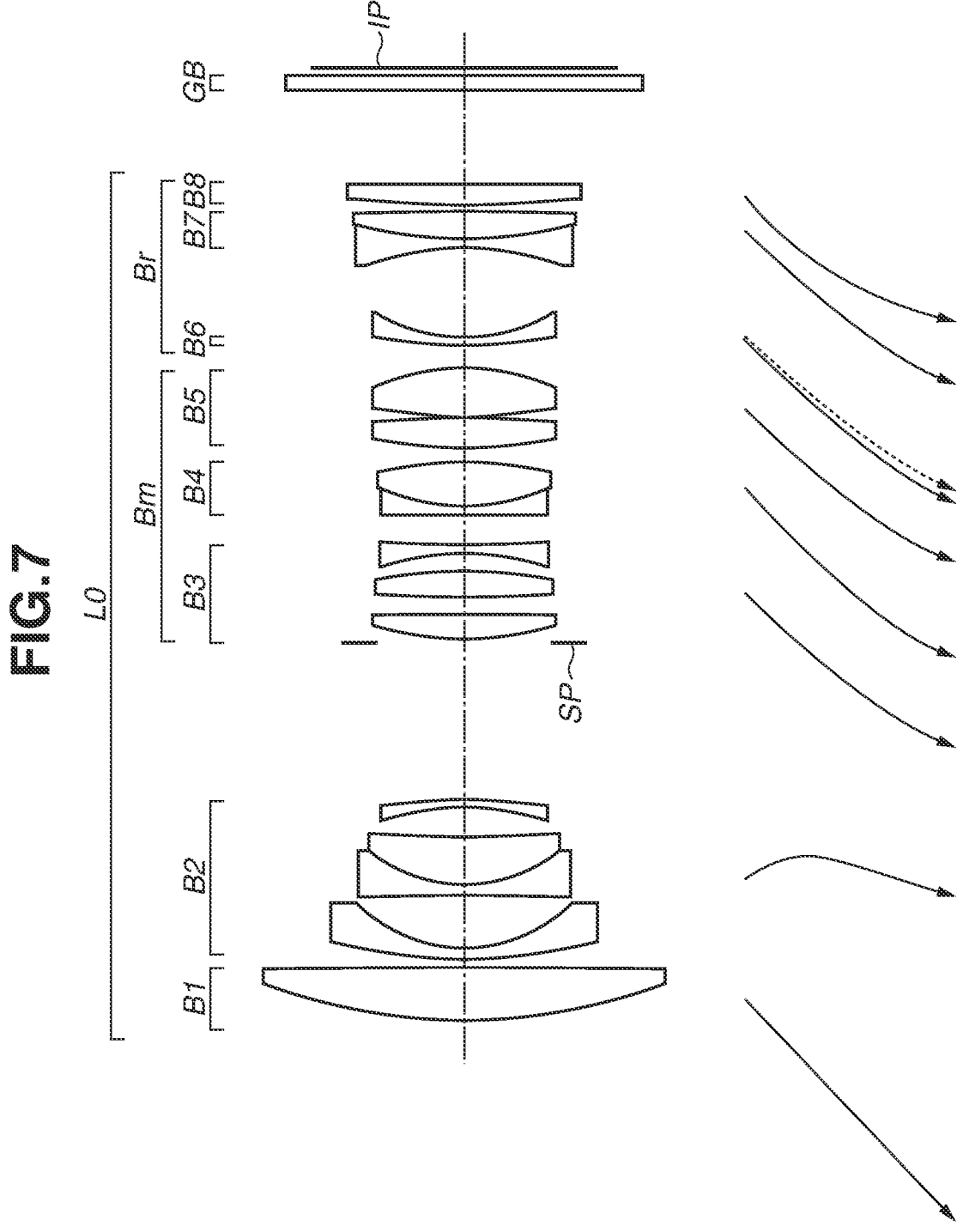
FIG. 7 illustrates a lens cross-sectional view of a zoom lens according to a fourth exemplary embodiment at the wide-angle end.

As illustrated in FIG. 7, the zoom lens L0 according to the fourth exemplary embodiment consists of the first lens unit B1 with positive refractive power, the second lens unit B2 with negative refractive power, the intermediate group Bm, and the rear group Br placed in this order from the object side to the image side.

The intermediate group Bm consists of the third lens unit B3 with positive refractive power, the fourth lens unit B4 with negative refractive power, and the fifth lens unit B5 with positive refractive power placed in this order from the object side to the image side. The rear group Br consists of the sixth lens unit B6 with negative refractive power, the seventh lens unit B7 with negative refractive power, and an eighth lens unit B8 with positive refractive power placed in this order from the object side to the image side.

In the zoom lens L0 according to the fourth exemplary embodiment, the eighth lens unit B8 with positive refractive power is placed next to the image side of the seventh lens unit B7 with negative refractive power, making it easier to prevent variation in field curvature that occurs during zooming.

Figure 9:
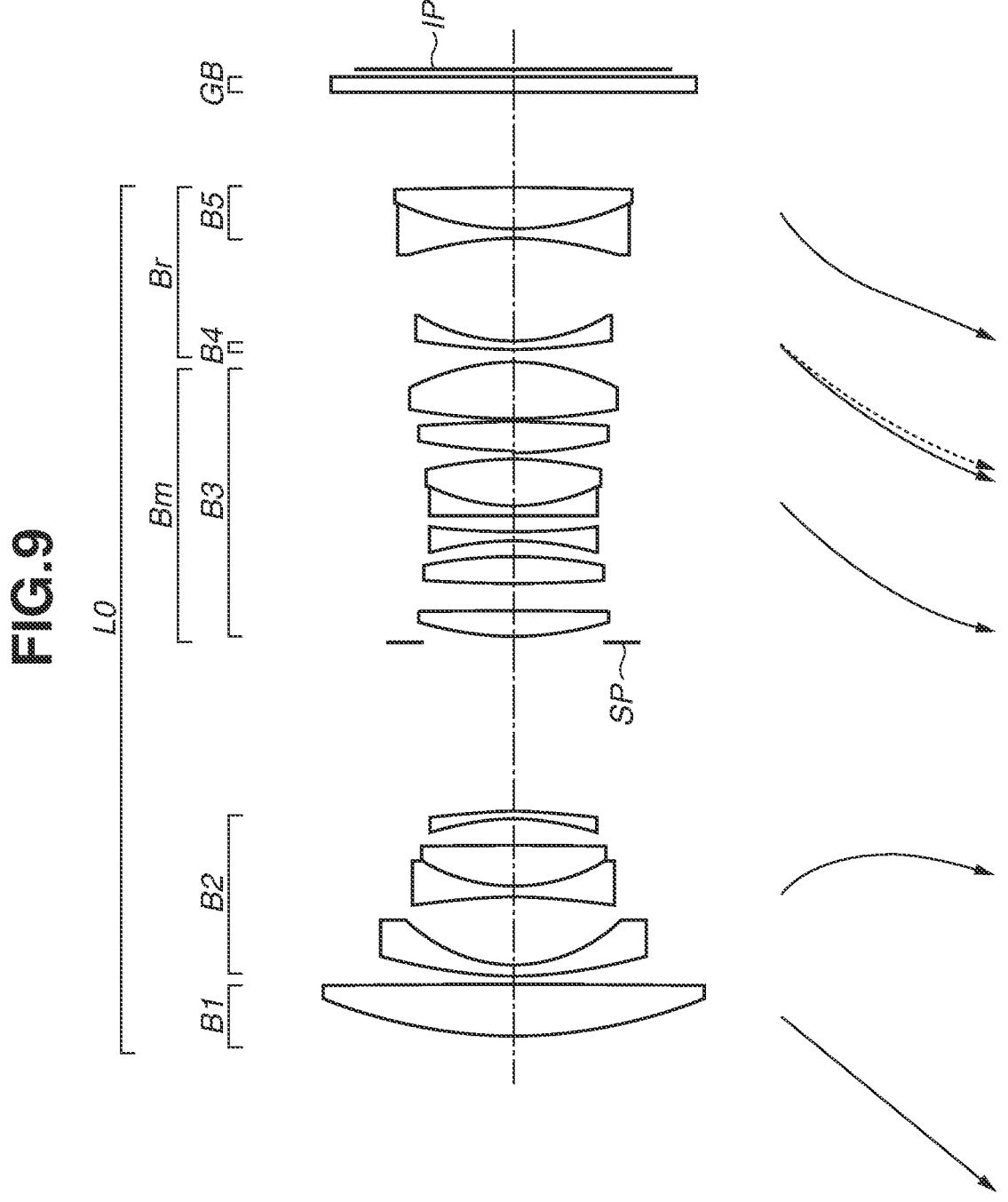
FIG. 9 illustrates a lens cross-sectional view of a zoom lens according to a fifth exemplary embodiment at the wide-angle end.

As illustrated in FIG. 9, the zoom lens L0 according to the fifth exemplary embodiment consists of the first lens unit B1 with positive refractive power, the second lens unit B2 with negative refractive power, the intermediate group Bm, and the rear group Br placed in this order from the object side to the image side.

The intermediate group Bm consists of the third lens unit B3 with positive refractive power. The rear group Br consists of the fourth lens unit B4 with negative refractive power and the fifth lens unit B5 with negative refractive power placed in this order from the object side to the image side.

In the zoom lens L0 according to the fifth exemplary embodiment, the lens units placed in the rear group Br are two lens units with negative refractive power, whereby the absolute value of the combined focal length of the rear group Br is relatively reduced. Consequently, the principal point of the entire system is placed on the object side, making it possible to reduce the total lens length.

First to fifth numerical examples respectively corresponding to the first to fifth exemplary embodiments will be described below.

In surface data of the numerical examples, r is a radius of curvature of each optical surface, and d (mm) is an on-axis interval (length on the optical axis) between the m-th surface and the (m+1)th surface, where m is a surface number counted from a light incidence side. Further, nd indicates a refractive index of each optical member for the d-line, and vd indicates the Abbe number of the optical member. The Abbe number vd of a material is defined as $$vd = (Nd-1)/(NF-NC),$$

where Nd, NF, and NC are the refractive indices at the d-line (wavelength 587.6 nm), the F-line (wavelength 486.1 nm), the C-line (wavelength 656.3 nm), and the g-line (wavelength 435.8 nm).

Two surfaces closest to the image side correspond to a glass block (GB). An aspherical shape is expressed by the following formula:

$$X = \frac{H^2/R}{1 + \sqrt{1 - (1+K)(H/R)^2}} + A4H^4 + A6H^6 + A8H^8 + A10H^{10} + A12H^{12},$$  [Formula 1]

where the optical axis direction is along an X-axis, a direction perpendicular to the optical axis is along an H-axis, a light travel direction is positive, R is a paraxial radius of curvature, K is a conic constant, and A4, A6, A8, A10, and A12 are aspherical coefficients.

The mark "*" indicates a surface having an aspherical shape. The expression "e-x" indicates $10^{-x}$, and bf is a back focus indicating an air-equivalent length on the optical axis from a lens surface closest to the image side in the lens unit placed closest to the image side, to the image plane. The terms "wide angle", "intermediate", and "telephoto" respectively indicate the wide-angle end, the zoom intermediate position, and the telephoto end.

First Numerical Example

Unit mm

Surface Data

| Surface Number | r | d | nd | vd |
|---|---|---|---|---|
| 1 | 71.698 | 7.40 | 1.49700 | 81.7 |
| 2 | −1074.771 | (Variable) | | |
| 3 | 95.769 | 1.60 | 1.89190 | 37.1 |
| 4 | 22.455 | 7.05 | | |
| 5 | −369.959 | 1.25 | 1.60311 | 60.6 |
| 6 | 22.126 | 7.00 | 1.90366 | 31.3 |
| 7 | 412.508 | 4.86 | | |
| 8 | −36.457 | 1.00 | 1.85150 | 40.8 |
| 9 | −89.252 | (Variable) | | |
| 10 (Stop) | ∞ | 0.65 | | |
| 11 | 43.928 | 3.45 | 2.00100 | 29.1 |
| 12 | −750.000 | 2.40 | | |
| 13* | 106.432 | 3.70 | 1.58313 | 59.4 |
| 14* | −70.798 | 2.33 | | |
| 15 | −41.445 | 1.20 | 1.77047 | 29.7 |
| 16 | 220.269 | (Variable) | | |
| 17 | ∞ | 1.20 | 1.85478 | 24.8 |
| 18 | 28.842 | 6.10 | 1.49700 | 81.7 |
| 19 | −56.203 | (Variable) | | |
| 20* | 55.622 | 3.80 | 1.58313 | 59.4 |
| 21* | −248.880 | 0.20 | | |
| 22 | 69.909 | 7.75 | 1.59522 | 67.7 |
| 23 | −31.690 | (Variable) | | |
| 24 | 71.379 | 1.10 | 1.61340 | 44.3 |
| 25 | 23.380 | (Variable) | | |
| 26 | −53.964 | 1.30 | 1.74400 | 44.8 |
| 27 | 43.097 | 4.80 | 1.92286 | 20.9 |
| 28 | −750.000 | (Variable) | | |
| 29 | ∞ | 2.00 | 1.54400 | 66.3 |
| 30 | ∞ | (Variable) | | |
| Image Plane | ∞ | | | |

Aspherical Data

13th Surface

K = 0.00000e+00  A4 = −5.91734e−06  A6 = −1.25922e−08
A8 = −6.96192e−11  A10 = −1.24634e−13  A12 = 3.32938e−16

12

-continued

Unit mm

14th Surface

K = 0.00000e+00  A4 = −2.81431e−06  A6 = −1.15888e−08
A8 = −1.20810e−10  A10 = 3.67743e−13  A12 = −6.62375e−16

20th Surface

K = 0.00000e+00  A4 = −2.16306e−06  A6 = −3.51669e−08
A8 = 3.80997e−12  A10 = −8.02806e−13  A12 = 7.68937e−16

21st Surface

K = 0.00000e+00  A4 = 1.35282e−05  A6 = −2.86368e−08
A8 = 3.89958e−11  A10 = −1.08816e−12  A12 = 1.83610e−15

Various Data

| Zoom Ratio | | 2.36 | |
|---|---|---|---|
| | Wide Angle | Intermediate | Telephoto |
| Focal Length | 28.80 | 49.00 | 67.90 |
| F-number | 2.88 | 2.88 | 2.92 |
| Half Angle of View | 34.93 | 23.82 | 17.67 |
| Image Height | 21.64 | 21.64 | 21.64 |
| Total Lens Length | 132.38 | 144.25 | 158.83 |
| bf | 15.39 | 26.31 | 34.87 |
| d2 | 0.85 | 15.70 | 26.56 |
| d9 | 21.64 | 7.73 | 2.90 |
| d16 | 4.86 | 2.83 | 2.01 |
| d19 | 2.00 | 4.04 | 4.86 |
| d23 | 3.22 | 3.12 | 2.00 |
| d25 | 12.68 | 12.78 | 13.90 |
| d28 | 13.00 | 23.93 | 32.48 |
| d30 | 1.09 | 1.09 | 1.09 |

Zoom Lens Unit Data

| Unit | Starting Surface | Focal Length |
|---|---|---|
| B1 | 1 | 135.53 |
| B2 | 3 | −27.10 |
| B3 | 10 | 51.68 |
| B4 | 17 | −321.04 |
| B5 | 20 | 26.75 |
| B6 | 24 | −57.18 |
| B7 | 26 | −120.17 |

Second Numerical Example

Unit mm

Surface Data

| Surface Number | r | d | nd | vd |
|---|---|---|---|---|
| 2 | ∞ | 1.60 | | |
| 1 | 64.109 | 7.17 | 1.49700 | 81.5 |
| 2 | 4538.818 | (Variable) | | |
| 3 | 110.231 | 1.80 | 1.59522 | 67.7 |
| 4 | 21.806 | 8.58 | | |
| 5 | −146.659 | 1.50 | 1.61340 | 44.3 |
| 6 | 25.001 | 4.89 | 2.00100 | 29.1 |
| 7 | 94.515 | 4.46 | | |
| 8 | −42.715 | 1.30 | 1.53775 | 74.7 |
| 9 | −130.569 | (Variable) | | |
| 10 (Stop) | ∞ | 1.80 | | |
| 11 | 33.675 | 2.98 | 1.59522 | 67.7 |
| 12 | 92.568 | 2.87 | | |
| 13* | 75.661 | 3.74 | 1.58313 | 59.4 |
| 14* | −96.472 | 3.66 | | |
| 15 | −28.115 | 1.22 | 1.77047 | 29.7 |
| 16 | −80.146 | (Variable) | | |
| 17* | 57.289 | 5.74 | 1.58313 | 59.4 |
| 18* | −37.418 | 0.26 | | |

13

-continued

| Unit mm | | | | |
|---|---|---|---|---|
| 19 | 956.173 | 1.40 | 1.85478 | 24.8 |
| 20 | 71.298 | 7.39 | 1.59522 | 67.7 |
| 21 | −29.436 | (Variable) | | |
| 22 | 102.308 | 1.00 | 1.78470 | 26.3 |
| 23 | 27.735 | (Variable) | | |
| 24 | −323.671 | 1.60 | 1.75500 | 52.3 |
| 25 | 27.770 | 5.39 | 1.92286 | 20.9 |
| 26 | 135.653 | (Variable) | | |
| 27 | ∞ | 2.00 | 1.54400 | 66.3 |
| 28 | ∞ | (Variable) | | |
| Image Plane | ∞ | | | |

Aspherical Data

13th Surface

K = 0.00000e+00  A4 = −4.99308e−06  A6 = 9.56563e−11
A8 = 2.28657e−11  A10 = 6.19341e−13

14th Surface

K = 0.00000e+00  A4 = −3.09477e−06  A6 = 9.21828e−09
A8 = −7.68728e−11  A10 = 9.48917e−13

17th Surface

K = 0.00000e+00  A4 = −5.65839e−06  A6 = 5.09383e−08
A8 = 9.98074e−11  A10 = −5.71949e−13  A12 = 2.69551e−15

18th Surface

K = 0.00000e+00  A4 = 2.10447e−05  A6 = 4.37658e−08
A8 = 9.78884e−11  A10 = −3.21204e−13  A12 = 2.51468e−15

Various Data

| Zoom Ratio | | 2.39 | |
|---|---|---|---|

| | Wide Angle | Intermediate | Telephoto |
|---|---|---|---|
| Focal Length | 28.80 | 49.00 | 68.80 |
| F-number | 2.88 | 2.88 | 2.88 |
| Half Angle of View | 34.92 | 23.68 | 17.46 |
| Image Height | 21.64 | 21.64 | 21.64 |
| Total Lens Length | 127.13 | 138.45 | 151.03 |
| bf | 15.39 | 27.19 | 37.02 |
| d2 | 0.85 | 14.36 | 23.61 |
| d9 | 17.85 | 6.94 | 2.00 |
| d16 | 7.91 | 4.82 | 3.27 |
| d21 | 7.33 | 4.02 | 2.00 |
| d23 | 7.45 | 10.76 | 12.79 |
| d26 | 13.00 | 24.80 | 34.63 |
| d28 | 1.09 | 1.09 | 1.09 |

Zoom Lens Unit Data

| Unit | Starting Surface | Focal Length |
|---|---|---|
| B1 | 1 | 130.77 |
| B2 | 3 | −31.26 |
| B3 | 10 | 102.51 |
| B4 | 17 | 25.35 |
| B5 | 22 | −48.78 |
| B6 | 24 | −330.93 |

Third Numerical Example

| Unit mm | | | | |
|---|---|---|---|---|
| Surface Data | | | | |
| Surface Number | r | d | nd | vd |
| 1 | 69.090 | 7.40 | 1.49700 | 81.5 |
| 2 | −803.300 | (Variable) | | |
| 3 | 121.485 | 1.80 | 1.59522 | 67.7 |

14

-continued

| Unit mm | | | | |
|---|---|---|---|---|
| 4 | 22.418 | 8.77 | | |
| 5 | −134.878 | 1.50 | 1.61340 | 44.3 |
| 6 | 26.095 | 4.63 | 2.00100 | 29.1 |
| 7 | 103.970 | 4.45 | | |
| 8 | −39.791 | 1.30 | 1.53775 | 74.7 |
| 9 | −136.339 | (Variable) | | |
| 10 (Stop) | 00 | 1.80 | | |
| 11 | 31.872 | 3.21 | 1.59522 | 67.7 |
| 12 | 95.837 | 2.80 | | |
| 13* | 74.280 | 3.64 | 1.58313 | 59.4 |
| 14* | −111.093 | 3.73 | | |
| 15 | −28.556 | 1.33 | 1.77047 | 29.7 |
| 16 | −84.332 | (Variable) | | |
| 17* | 58.568 | 5.63 | 1.58313 | 59.4 |
| 18* | −37.260 | 0.78 | | |
| 19 | 1434.050 | 1.40 | 1.85478 | 24.8 |
| 20 | 75.530 | 7.14 | 1.59522 | 67.7 |
| 21 | −29.651 | (Variable) | | |
| 22 | 139.647 | 1.00 | 1.78470 | 26.3 |
| 23 | 27.157 | (Variable) | | |
| 24 | −3733.823 | 1.60 | 1.75500 | 52.3 |
| 25 | 29.164 | 5.85 | 1.92286 | 20.9 |
| 26 | 204.217 | (Variable) | | |
| 27 | ∞ | 2.00 | 1.54400 | 66.3 |
| 28 | ∞ | (Variable) | | |
| Image Plane | ∞ | | | |

Aspherical Data

13th Surface

K = 0.00000e+00  A4 = −5.32077e−06  A6 = 7.65017e−09
A8 = −4.96809e−11  A10 = 1.19886e−12

14th Surface

K = 0.00000e+00  A4 = −4.15343e−06  A6 = 2.86367e−08
A8 = −2.46191e−10  A10 = 1.83092e−12

17th Surface

K = 0.00000e+00  A4 = −7.75733e−06  A6 = 7.82802e−08
A8 = −5.68650e−11  A10 = −5.97309e−15  A12 = 2.47205e−15

18th Surface

K = 0.00000e+00  A4 = 1.98553e−05  A6 = 5.79944e−08
A8 = 4.92930e−11  A10 = −1.42165e−13  A12 = 2.87702e−15

Various Data

| Zoom Ratio | | 2.39 | |
|---|---|---|---|

| | Wide Angle | Intermediate | Telephoto |
|---|---|---|---|
| Focal Length | 28.80 | 50.00 | 68.80 |
| F-number | 2.88 | 2.88 | 2.88 |
| Half Angle of View | 34.92 | 23.26 | 17.46 |
| Image Height | 21.64 | 21.64 | 21.64 |
| Total Lens Length | 127.13 | 139.11 | 151.03 |
| bf | 15.39 | 27.80 | 37.28 |
| d2 | 0.85 | 14.97 | 23.52 |
| d9 | 18.11 | 6.72 | 2.00 |
| d16 | 6.55 | 3.38 | 2.00 |
| d21 | 7.69 | 4.67 | 2.88 |
| d23 | 7.19 | 10.21 | 12.00 |
| d26 | 13.00 | 25.41 | 34.89 |
| d28 | 1.09 | 1.09 | 1.09 |

Zoom Lens Unit Data

| Unit | Starting Surface | Focal Length |
|---|---|---|
| B1 | 1 | 128.37 |
| B2 | 3 | −30.04 |
| B3 | 10 | 95.30 |
| B4 | 17 | 25.64 |
| B5 | 22 | −43.13 |
| B6 | 24 | 900.00 |

Fourth Numerical Example

Unit mm

Surface Data

| Surface Number | r | d | nd | νd |
|---|---|---|---|---|
| 1 | 79.594 | 7.59 | 1.49700 | 81.7 |
| 2 | −835.318 | (Variable) | | |
| 3 | 73.280 | 1.60 | 1.89190 | 37.1 |
| 4 | 21.548 | 7.37 | | |
| 5 | −369.959 | 1.25 | 1.60311 | 60.6 |
| 6 | 21.168 | 6.95 | 1.90366 | 31.3 |
| 7 | 289.158 | 4.06 | | |
| 8 | −36.165 | 1.00 | 1.85150 | 40.8 |
| 9 | −91.177 | (Variable) | | |
| 10 (Stop) | ∞ | 0.60 | | |
| 11 | 44.013 | 3.47 | 2.00100 | 29.1 |
| 12 | −750.000 | 2.36 | | |
| 13* | 107.718 | 3.73 | 1.58313 | 59.4 |
| 14* | −69.983 | 2.47 | | |
| 15 | −39.067 | 1.20 | 1.77047 | 29.7 |
| 16 | 199.294 | (Variable) | | |
| 17 | ∞ | 1.20 | 1.85478 | 24.8 |
| 18 | 29.445 | 6.20 | 1.49700 | 81.7 |
| 19 | −54.091 | (Variable) | | |
| 20* | 54.923 | 4.13 | 1.58313 | 59.4 |
| 21* | −150.167 | 0.20 | | |
| 22 | 75.662 | 6.75 | 1.59522 | 67.7 |
| 23 | −33.194 | (Variable) | | |
| 24 | 83.342 | 1.10 | 1.61340 | 44.3 |
| 25 | 24.485 | (Variable) | | |
| 26 | −41.988 | 1.30 | 1.74400 | 44.8 |
| 27 | 59.444 | 3.71 | 1.92286 | 20.9 |
| 28 | −750.000 | (Variable) | | |
| 29 | 150.000 | 3.00 | 2.00100 | 29.1 |
| 30 | −1033.371 | (Variable) | | |
| 31 | ∞ | 2.00 | 1.54400 | 66.3 |
| 32 | ∞ | (Variable) | | |
| Image Plane | ∞ | | | |

Aspherical Data

13th Surface

K = 0.00000e+00     A4 = −4.20525e−06     A6 = −3.82772e−08
A8 = 2.77210e−10     A10 = −1.84598e−12     A12 = 4.13300e−15

14th Surface

K = 0.00000e+00     A4 = −7.76915e−07     A6 = −4.58293e−08
A8 = 3.25378e−10     A10 = −1.82949e−12     A12 = 3.89584e−15

20th Surface

K = 0.00000e+00     A4 = −4.04521e−06     A6 = −3.55365e−08
A8 = 3.62232e−11     A10 = −4.52586e−13     A12 = −5.35347e−16

21st Surface

K = 0.00000e+00     A4 = 9.66538e−06     A6 = −2.63857e−08
A8 = 2.80285e−11     A10 = −5.56106e−13     A12 = 1.71401e−16

Various Data

| Zoom Ratio | 2.36 | | |
|---|---|---|---|
| | Wide Angle | Intermediate | Telephoto |
| Focal Length | 28.80 | 49.00 | 67.90 |
| F-number | 2.88 | 2.88 | 2.88 |
| Half Angle of View | 34.93 | 23.82 | 17.67 |
| Image Height | 21.64 | 21.64 | 21.64 |
| Total Lens Length | 133.93 | 147.58 | 164.79 |
| bf | 15.39 | 26.87 | 33.17 |
| d2 | 0.93 | 17.37 | 29.29 |
| d9 | 21.92 | 7.63 | 3.07 |
| d16 | 4.14 | 2.68 | 2.05 |

-continued

Unit mm

| | | | |
|---|---|---|---|
| d19 | 2.00 | 3.46 | 4.09 |
| d23 | 3.31 | 3.13 | 2.00 |
| d25 | 12.42 | 12.60 | 13.73 |
| d28 | 1.00 | 1.00 | 4.55 |
| d30 | 13.00 | 24.49 | 30.79 |
| d32 | 1.09 | 1.09 | 1.09 |

Zoom Lens Unit Data

| Unit | Starting Surface | Focal Length |
|---|---|---|
| B1 | 1 | 146.62 |
| B2 | 3 | −27.63 |
| B3 | 10 | 54.59 |
| B4 | 17 | −400.00 |
| B5 | 20 | 26.50 |
| B6 | 24 | −56.93 |
| B7 | 26 | −74.69 |
| B8 | 29 | 131.02 |

Fifth Numerical Example

Unit mm

Surface Data

| Surface Number | r | d | nd | νd |
|---|---|---|---|---|
| 1 | 70.085 | 7.30 | 1.49700 | 81.7 |
| 2 | −1574.782 | (Variable) | | |
| 3 | 60.612 | 1.60 | 1.89190 | 37.1 |
| 4 | 21.042 | 9.52 | | |
| 5 | −77.202 | 1.25 | 1.60311 | 60.6 |
| 6 | 23.779 | 5.97 | 1.90366 | 31.3 |
| 7 | −399.826 | 3.48 | | |
| 8 | −33.442 | 1.00 | 1.85150 | 40.8 |
| 9 | −68.541 | (Variable) | | |
| 10 (Stop) | ∞ | 0.60 | | |
| 11 | 40.797 | 3.56 | 2.00100 | 29.1 |
| 12 | 3588.308 | 3.82 | | |
| 13* | 88.425 | 3.79 | 1.58313 | 59.4 |
| 14* | −75.107 | 2.30 | | |
| 15 | −42.118 | 1.20 | 1.77047 | 29.7 |
| 16 | 122.233 | 2.24 | | |
| 17 | ∞ | 1.20 | 1.85478 | 24.8 |
| 18 | 25.603 | 6.52 | 1.49700 | 81.7 |
| 19 | −54.236 | 1.00 | | |
| 20* | 50.362 | 4.17 | 1.58313 | 59.4 |
| 21* | −173.006 | 0.20 | | |
| 22 | 73.842 | 7.91 | 1.59522 | 67.7 |
| 23 | −30.992 | (Variable) | | |
| 24 | 73.148 | 1.10 | 1.61340 | 44.3 |
| 25 | 23.688 | (Variable) | | |
| 26 | −46.222 | 1.30 | 1.74400 | 44.8 |
| 27 | 38.043 | 5.96 | 1.92286 | 20.9 |
| 28 | −264.067 | (Variable) | | |
| 29 | ∞ | 2.00 | 1.54400 | 66.3 |
| 30 | ∞ | (Variable) | | |
| Image Plane | ∞ | | | |

-continued

| Unit mm | | |
| --- | --- | --- |
| Aspherical Data | | |

13th Surface

| K = 0.00000e+00 | A4 = −9.51958e−06 | A6 = 3.27515e−08 |
| A8 = −6.64755e−10 | A10 = 3.31255e−12 | A12 = −7.78473e−15 |

14th Surface

| K = 0.00000e+00 | A4 = −6.21422e−06 | A6 = 2.98009e−08 |
| A8 = −6.62840e−10 | A10 = 3.56637e−12 | A12 = −8.29869e−15 |

20th Surface

| K = 0.00000e+00 | A4 = −4.06926e−06 | A6 = −4.50722e−08 |
| A8 = 1.02428e−10 | A10 = −1.37819e−12 | A12 = 1.60037e−15 |

21st Surface

| K = 0.00000e+00 | A4 = 1.13553e−05 | A6 = −3.18660e−08 |
| A8 = 4.63977e−11 | A10 = −1.17301e−12 | A12 = 1.72462e−15 |

| Various Data | | |
| --- | --- | --- |

| Zoom Ratio | 2.36 |
| --- | --- |

| Wide Angle | Intermediate | Telephoto |
| --- | --- | --- |

-continued

| Unit mm | | | |
| --- | --- | --- | --- |
| Focal Length | 28.80 | 50.00 | 67.90 |
| F-number | 2.88 | 2.88 | 2.88 |
| Angle of View | 34.93 | 23.40 | 17.67 |
| Image Height | 21.64 | 21.64 | 21.64 |
| Total Lens Length | 132.41 | 142.47 | 156.50 |
| BF | 2.39 | 2.39 | 2.39 |
| d2 | 0.85 | 16.48 | 27.47 |
| d9 | 23.29 | 7.35 | 2.90 |
| d23 | 1.76 | 2.21 | 1.00 |
| d25 | 14.14 | 13.73 | 15.15 |
| d28 | 13.00 | 23.33 | 30.62 |
| d30 | 1.09 | 1.09 | 1.09 |

| Zoom Lens Unit Data | | |
| --- | --- | --- |
| Unit | Starting Surface | Focal Length |
| B1 | 1 | 135.21 |
| B2 | 3 | −28.05 |
| B3 | 10 | 28.37 |
| B4 | 24 | −57.60 |
| B5 | 26 | −130.23 |

The table below presents various values in the exemplary embodiments.

TABLE 1

| | | First Exemplary Emboiment | Second Exemplary Embodiment | Third Exemplary Embodiment | Fourth Exemplary Embodiment | Fifth Exemplary Embodiment |
| --- | --- | --- | --- | --- | --- | --- |
| | fw | 28.800 | 28.800 | 28.800 | 28.800 | 28.800 |
| | ft | 67.900 | 68.800 | 68.800 | 67.900 | 67.900 |
| | bfw | 15.386 | 15.386 | 15.386 | 15.386 | 15.387 |
| | f1 | 135.529 | 130.771 | 128.367 | 146.620 | 135.207 |
| | f2 | −27.100 | −31.262 | −30.043 | −27.632 | −28.048 |
| Inequality (1) | f1/\|f2\| | 5.00 | 4.18 | 4.27 | 5.31 | 4.82 |
| Inequality (2) | \|f2\|/bfw | 1.76 | 2.03 | 1.95 | 1.80 | 1.82 |
| Inequality (3) | fn/f2 | 1.34 | 1.31 | 1.50 | 1.55 | 1.34 |
| Inequality (4) | f1/ft | 2.00 | 1.90 | 1.87 | 2.16 | 1.99 |
| Inequality (5) | \|f2\|/fw | 0.94 | 1.09 | 1.04 | 0.96 | 0.97 |
| Inequality (6) | Lt/ft | 1.80 | 1.63 | 1.63 | 1.91 | 1.82 |
| Inequality (7) | fp/\|fn\| | 0.80 | 0.68 | 0.61 | 0.67 | 0.75 |
| Inequality (8) | \|fn\|/f1 | 0.27 | 0.31 | 0.35 | 0.29 | 0.28 |
| Inequality (9) | ff/f2 | 2.11 | 1.56 | 1.44 | 2.06 | 2.05 |
| Inequality (10) | ff/fn | 1.57 | 1.19 | 0.96 | 1.33 | 1.53 |
| Inequality (11) | fp/ft | 0.43 | 0.40 | 0.40 | 0.42 | 0.42 |
| Inequality (12) | \|fn\|/fw | 1.26 | 1.42 | 1.57 | 1.48 | 1.31 |
| Inequality (13) | \|fn\|/ft | 0.54 | 0.60 | 0.66 | 0.63 | 0.55 |
| Inequality (14) | Lt/fp | 4.22 | 4.06 | 4.05 | 4.55 | 4.35 |
| Inequality (15) | Lt/\|fn\| | 3.36 | 2.74 | 2.49 | 3.04 | 3.28 |

[Imaging Apparatus]

Figure 11:
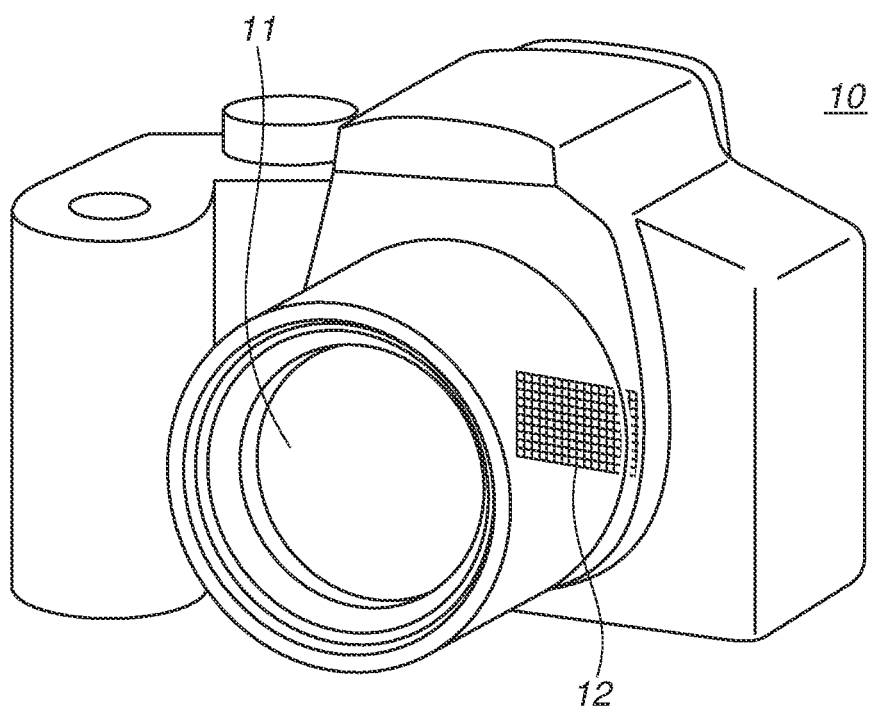
FIG. 11 illustrates a schematic diagram of an imaging apparatus.

Next, a digital still camera (imaging apparatus) using a zoom lens according to an exemplary embodiment of the disclosure as an imaging optical system will be described with reference to FIG. 11. In FIG. 11, an imaging optical system 11 is an imaging optical system formed using the zoom lens according to one of the first to fifth exemplary embodiments. An image sensor (photoelectric conversion element) 12 is an image sensor such as a CCD sensor or a CMOS sensor that is built in a camera body 10. The image sensor 12 receives optical images formed by the imaging optical system 11 and photoelectrically converts the optical images. The camera body 10 may be a so-called single-lens reflex camera with a quick-return mirror or a so-called mirrorless camera without a quick-return mirror.

As described above, images with high resolution and wide angle of view are acquired by applying the zoom lens L0 according to an exemplary embodiment of the disclosure to an imaging apparatus such as a digital still camera.

While suitable exemplary embodiments and examples of the disclosure have been described above, the disclosure is not limited to the exemplary embodiments and the examples described above, and various combinations, modifications, and changes are possible within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-051695, filed Mar. 28, 2023, which is hereby incorporated by reference herein in its entirety.

What is claimed is:

1. A zoom lens comprising a plurality of lens units, the plurality of lens units consisting of a first lens unit with positive refractive power, a second lens unit with negative refractive power, an intermediate group including an aperture stop and at least one lens unit, and a rear group including at least two lens units placed in this order from an object side to an image side, wherein an interval between adjacent lens units changes during zooming, wherein a lens unit of the rear group that is placed closest to the object side has the strongest negative refractive power among lens units placed closer to the image side than the aperture stop, wherein, in zooming from a wide-angle end to a telephoto end, every lens unit included in the first lens unit, the intermediate group, and the rear group moves toward the object side, and the second lens unit moves along a convex trajectory toward the image side, and wherein the following inequalities are satisfied:

$$3.30 < f1/|f2| < 5.90,$$

$$1.40 < |f2|/bfw < 2.50, \text{ and}$$

$$1.00 < fn/f2 < 1.60,$$

where f1 is a focal length of the first lens unit, f2 is a focal length of the second lens unit, bfw is a back focus of an entire system at a wide-angle end, and fn is a combined focal length of the rear group at the wide-angle end.

2. The zoom lens according to claim 1, wherein the following inequality is satisfied:

$$1.31 < f1/ft < 2.81,$$

where ft is a focal length of the entire system at the telephoto end.

3. The zoom lens according to claim 1, wherein the following inequality is satisfied:

$$0.66 < |f2|/fw < 1.41,$$

where fw is a focal length of the entire system at the wide-angle end.

4. The zoom lens according to claim 1, wherein the following inequality is satisfied:

$$1.14 < Lt/ft < 2.49,$$

where Lt is a length from a lens surface closest to the object side to a lens surface closest to the image side on an optical axis at the telephoto end, and ft is a focal length of the entire system at the telephoto end.

5. The zoom lens according to claim 1, wherein the following inequality is satisfied:

$$0.43 < fp/|fn| < 1.04,$$

where fp is a combined focal length of the intermediate group at the wide-angle end.

6. The zoom lens according to claim 1, wherein the following inequality is satisfied:

$$0.19 < fn/f1 < 0.46.$$

7. The zoom lens according to claim 1, wherein the lens unit of the rear group that is placed closest to the object side moves during focusing.

8. The zoom lens according to claim 7, wherein the following inequality is satisfied:

$$1.00 < ff/f2 < 2.74,$$

where ff is a focal length of the lens unit of the rear group that is placed closest to the object side.

9. The zoom lens according to claim 7, wherein the following inequality is satisfied:

$$0.67 < ff/fn < 2.04,$$

where ff is a focal length of the lens unit of the rear group that is placed closest to the object side.

10. The zoom lens according to claim 1, wherein the following inequality is satisfied:

$$0.28 < fp/ft < 0.56,$$

where fp is a combined focal length of the intermediate group at the wide-angle end, and ft is a focal length of the entire system at the telephoto end.

11. The zoom lens according to claim 1, wherein the following inequality is satisfied:

$$0.88 < fn/fw < 2.03,$$

where fw is a focal length of the entire system at the wide-angle end.

12. The zoom lens according to claim 1, wherein the following inequality is satisfied:

$$0.38 < |fn|/ft < 0.85,$$

where ft is a focal length of the entire system at the telephoto end.

13. The zoom lens according to claim 1, wherein the following inequality is satisfied:

$$2.83 < Lt/fp < 5.92,$$

where Lt is a length from a lens surface closest to the object side to a lens surface closest to the image side on an optical axis at the telephoto end, and fp is a combined focal length of the intermediate group at the wide-angle end.

14. The zoom lens according to claim 1, wherein the following inequality is satisfied:

$$1.74 < Lt/|fn| < 4.37,$$

where Lt is a length from a lens surface closest to the object side to a lens surface closest to the image side on an optical axis at the telephoto end.

15. The zoom lens according to claim 1, wherein the first lens unit consists of one lens.

16. The zoom lens according to claim 1, wherein the second lens unit consists of four lenses.

17. The zoom lens according to claim 1, wherein the intermediate group consists of a third lens unit with positive refractive power, a fourth lens unit with negative refractive power, and a fifth lens unit with positive refractive power placed in this order from the object side to the image side.

18. The zoom lens according to claim 1, wherein the intermediate group consists of a third lens unit with positive refractive power and a fourth lens unit with positive refractive power placed in this order from the object side to the image side.

19. The zoom lens according to claim 1, wherein the rear group consists of a lens unit with negative refractive power and a lens unit with negative refractive power placed in this order from the object side to the image side.

20. The zoom lens according to claim 1, wherein the rear group consists of a lens unit with negative refractive power and a lens unit with positive refractive power placed in this order from the object side to the image side.

21. The zoom lens according to claim 1, wherein the rear group consists of a lens unit with negative refractive power, a lens unit with negative refractive power, and a lens unit with positive refractive power placed in this order from the object side to the image side.

22. An apparatus comprising:

a zoom lens; and a sensor configured to receive an image formed by the zoom lens, wherein the zoom lens comprising a plurality of lens units, the plurality of lens units consisting of, a first lens unit with positive refractive power, a second lens unit with negative refractive power, an intermediate group including an aperture stop and at least one lens unit, and a rear group including at least two lens units placed in this order from an object side to an image side, wherein an interval between adjacent lens units changes during zooming, wherein a lens unit of the rear group that is placed closest to the object side has the strongest negative refractive power among lens units placed closer to the image side than the aperture stop, wherein, in zooming from a wide-angle end to a telephoto end, every lens unit included in the first lens unit, the intermediate group, and the rear group moves toward the object side, and the second lens unit moves along a convex trajectory toward the image side, and wherein the following inequalities are satisfied:

$$3.30 < f1/|f2| < 5.90,$$

$$1.40 < |f2|/bfw < 2.50, \text{ and}$$

$$1.00 < fn/f2 < 1.60,$$

where f1 is a focal length of the first lens unit, f2 is a focal length of the second lens unit, bfw is a back focus of an entire system at a wide-angle end, and fn is a combined focal length of the rear group at the wide-angle end.

* * * * *